(12) United States Patent
Pabst et al.

(10) Patent No.: US 11,913,337 B2
(45) Date of Patent: Feb. 27, 2024

(54) METHOD AND DEVICE FOR THE AUTOMATED ARRANGEMENT OF TUNNEL LINING SEGMENTS

(71) Applicant: HERRENKNECHT AG, Schwanau (DE)

(72) Inventors: Stefan Pabst, Lahr (DE); Frederic Seng, Kenzingen (DE)

(73) Assignee: Herrenknecht AG, Schwanau (DE)

( * ) Notice: Subject to any disclaimer, the term of this patent is extended or adjusted under 35 U.S.C. 154(b) by 0 days.

(21) Appl. No.: 17/788,118

(22) PCT Filed: Dec. 31, 2020

(86) PCT No.: PCT/EP2020/088085
§ 371 (c)(1),
(2) Date: Mar. 15, 2023

(87) PCT Pub. No.: WO2021/136837
PCT Pub. Date: Jul. 8, 2021

(65) Prior Publication Data
US 2023/0296022 A1   Sep. 21, 2023

(30) Foreign Application Priority Data

Dec. 31, 2019 (DE) ...................... 10 2019 135 908.2
Jan. 17, 2020 (DE) ...................... 10 2020 101 081.8

(51) Int. Cl.
*E21D 11/40* (2006.01)
*B25J 9/16* (2006.01)
(Continued)

(52) U.S. Cl.
CPC ............. *E21D 11/40* (2013.01); *B25J 9/1679* (2013.01); *B25J 13/088* (2013.01); *B25J 19/023* (2013.01)

(58) Field of Classification Search
CPC ........ E21D 11/40; E21D 9/004; B25J 9/1679; B25J 13/088; B25J 19/023; B25J 9/1697; B25J 11/00
See application file for complete search history.

(56) References Cited

U.S. PATENT DOCUMENTS

2013/0158947 A1   6/2013   Suzuki

FOREIGN PATENT DOCUMENTS

| AT | 409161 B | 10/2001 |
|---|---|---|
| CN | 104747213 A | 5/2018 |

(Continued)

*Primary Examiner* — Stephen A Vu
(74) *Attorney, Agent, or Firm* — Mark Rodgers

(57) ABSTRACT

The invention relates to a device for the automated installation of at least one tunnel lining segment of a tunnel lining ring, said device being couplable to a tunnelling machine, • having a manipulator with at least one tool for receiving, holding and placing the at least one tunnel lining segment, and with at least one actuator for moving the at least one tool, the at least one tool being movable • by means of the at least one actuator in the radial, tangential and/or axial direction in relation to the machine axis of the tunnelling machine in the space of the tunnel section created by the tunnelling machine, • having at least one tool position sensor, which is provided on the manipulator and/or tool, for sensing the respective actual position and actual location of the tool in the space of the tunnel section, having at least one tunnel lining segment sensor, which is provided on the manipulator and/or tool, with which an actual position and/or actual location of at least one section of at least one already arranged tunnel lining segment can be sensed, and/or with which an actual position and/or actual location of the tunnel lining segment to be placed can be sensed, • having a controller, which accesses installation data of the tunnel lining segments and which accesses the measurement data of the at least one tool position sensor and the at least (Continued)

Figure 1:
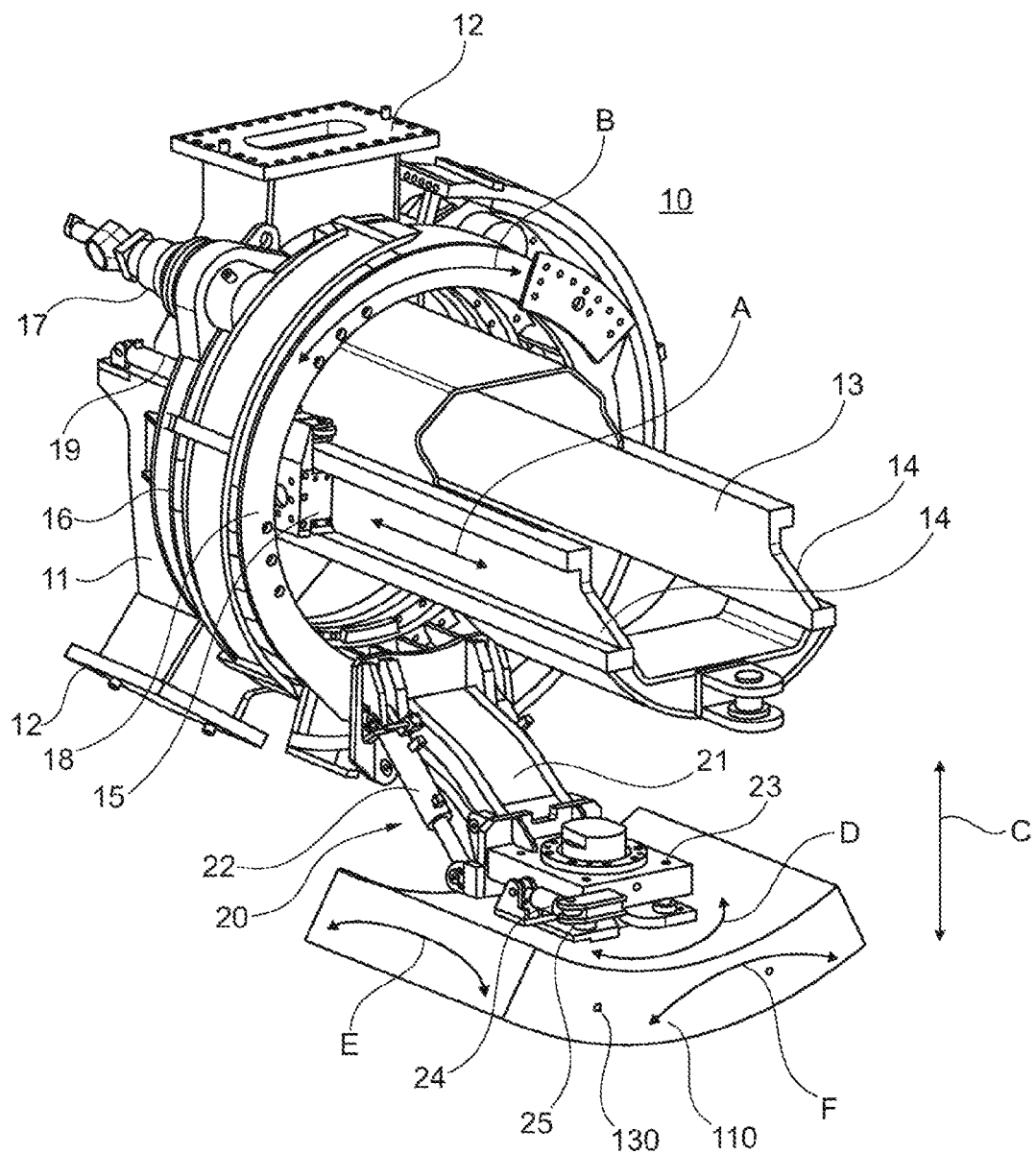

one tunnel lining segment sensor, and with which the at least one actuator and the at least one tool can be controlled on the basis of the installation data and measurement data in order to move the tool from the receiving position to the target placing position of the respective tunnel lining segment and to orient same in the actual placing position and to arrange same against the at least one already placed tunnel lining segment of the tunnel lining ring, wherein at least two tunnel lining segment sensors are provided, and wherein the tunnel lining segment sensor is a time-of-flight camera.

21 Claims, 10 Drawing Sheets

(51) Int. Cl.
  *B25J 13/08*      (2006.01)
  *B25J 19/02*      (2006.01)

(56)          References Cited

FOREIGN PATENT DOCUMENTS

| | | |
|---|---|---|
| FR | 2745327 B1 | 6/1997 |
| JP | H08296400 A | 11/1996 |
| JP | 2019085782 A | 6/2019 |
| WO | 2018065726 A1 | 4/2018 |

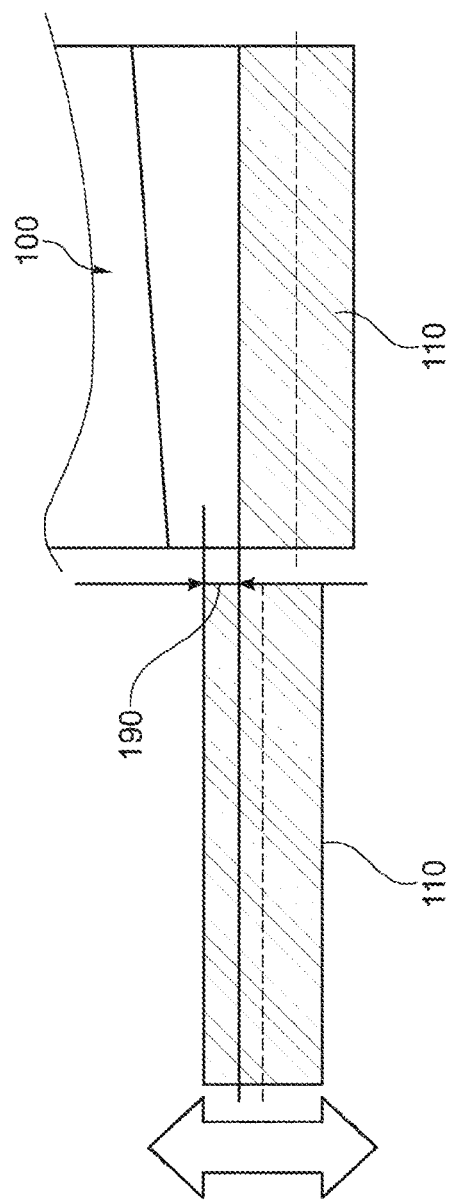

METHOD AND DEVICE FOR THE AUTOMATED ARRANGEMENT OF TUNNEL LINING SEGMENTS

The invention relates to a device and a method for the automated installation of at least one tunnel lining segment of a tunnel lining ring for lining a tunnel section driven by a tunneling machine, which device can be coupled to the tunneling machine, and a method for the automated installation of at least one tunnel lining segment of a tunnel lining ring.

When driving a tunnel using a tunneling machine, rings composed of steel-reinforced concrete segments (tubbings) are used, inter alia, as lining of the tunnel. They are placed for example under a shield of the tunneling machine or directly on the tunnel wall by means of an erector. For this purpose, the erector provides a manipulator, for example, which can be moved axially, radially and tangentially relative to the base of the erector.

Such manipulators are known from robotics, for example. In this case, they constitute for example the movable part of the robot and enable a physical interaction with the surroundings or with objects in the surroundings. In this case, the manipulator carries out work or tasks by way of special tools, for example. The tools are furthermore positioned in space by way of actuators. Furthermore, in this case, measurements are carried out which either enable the positioning or the processing and/or gather data for evaluation purposes. In this case, the manipulator has supporting components, for example, which are connected to one another movably by way of the actuators.

For placing the at least one tunnel lining segment, here a picking-up tool is arranged on the manipulator. This can involve gripping tools and/or suction tools, for example. The tool and respectively the manipulator itself are moved by way of actuators. In this case, the gripping tools grip for example a pin secured to the tunnel lining segment. The suction tools in turn suck up the tunnel lining segment directly, for example.

The tunnel lining segments are fed to a picking-up location in a defined order by way of a feeding unit (segment feeder). At the picking-up location, the tunnel lining segment is picked up by the tool of the manipulator, raised and moved to the respective placing location. Actuators that enable corresponding rotational, linear and/or tilting movements of the tool are provided for this purpose.

The movements of the manipulator and its tool have hitherto been controlled by an erector driver. In this case, the individual actuators of the erector or of the manipulator are actuated, preferably under remote control, by way of corresponding control elements. This is a dangerous activity since the erector driver has to be situated in the region of the erector in order to be able to place the tunnel lining segments within visual range. Furthermore, the erector/manipulator, on account of its many degrees of freedom and different actuators and the necessary precision in the placing of the tunnel lining segments, is moved with restricted speed of movement in order accordingly to be able to carry out the sequence of picking up, movement and placing safely in respect of their complexity, optionally with assistance of further persons on site.

The erector is a type of special crane, the tool of which can be moved for example hydraulically by way of axes in radial, tangential and axial directions with respect to the machine axis of the tunneling machine. In a manner governed by the design, the radial axis itself may be embodied for example as a telescopic unit or by way of a parallel articulation. For picking up the tunnel lining segments, the tool, also called erector head, is attached to the manipulator. The erector head has a picking-up mechanism in order to be able to raise and move the respective tunnel lining segment. For fine alignment, the location of the erector head can move about rotational axes that are driven hydraulically, for example, in the form of roll, pitch and yaw. In general, the actuators move the tool relative to the machine axis of the tunneling machine. In this case, the tool is moved for example axially along the machine axis, radially proceeding from the machine axis and rotationally about the machine axis (roll). Further rotational movements can for example also be effected about axes radially with respect to the machine axis of the tunneling machine (yaw and pitch).

A tunnel lining ring consists of a plurality of tunnel lining segments. The number of segments is variable depending on the ring construction. The tangential position of the individual segments in the ring is predefined depending on the construction of the tunnel lining. Depending on the design, a ring can consist of straight segments, in which the longitudinal joints are perpendicular to the ring joints, or of a combination for example of trapezoidal, semi-trapezoidal, straight tunnel lining segments and/or other shapes. By virtue of minimally different axial length dimensions of the segments, tunnel curves are realized by twisted laying with respect to one another.

Openings for mounting aids, so-called dowels, may be provided on the segments on their contact areas on the longitudinal joints and/or on the ring joints. The dowels are correspondingly inserted into the openings provided therefor into the tunnel lining segment. Once the segment has arrived at the corresponding placing position, the mounting aids are inserted into the openings provided therefor in the already placed segments. For this purpose, the erector driver performs a fine adjustment of the tool alignment in order to correspondingly insert the mounting aids. After that the segment is then correspondingly placed.

After the boring of a stroke of the tunneling machine (for example 1.2 m), the lining is begun. For this purpose, the erector picks up the first tunnel lining segment from the segment feeder. At the same time, the advancing presses of the tunneling machine that are situated in the region of the target placing of the tunnel lining segment are withdrawn in order that the region of the tunnel lining segment to be placed is enabled to be lined. After the tunnel lining segment has been placed, the advancing presses are extended again in order to press the tunnel lining segment against the previous lining ring into a final position. In this case, the edge seals of the tunnel lining segments are also pressed together to the necessary extent. Afterward, the tool of the erector is released and returned to the picking-up position in order to pick up the next tunnel lining segment. At the same time, the corresponding advancing presses are withdrawn and the sequence is repeated until the complete ring has been placed. When the keystone is introduced into the tunnel lining segment ring, the seals in the longitudinal joints are also compressed, the ring is closed and the tunnel lining segments are brought to their final position, position optionally resulting from final pressing of the tunnel lining segments by the advancing presses. After the lining has been completed, at a later time a ring space between tunnel wall and finished lining ring is then grouted with mortar, for example.

Since, as already set out, this is a strenuous activity which is not without danger and which at the same time must also be carried out at reduced speed owing to the complexity of the movement possibilities, for some time there have already been endeavors to automate the process of placing the tunnel lining segments to create the tunnel lining ring. For this purpose, a number of approaches are already known from the prior art; see, inter alia, FR 2,745,327, CN104747213, JPH08-296400, WO2018065726.

Since the tunnel lining segments are subject to manufacturing tolerances and even the driven tunnel wall against which the tunnel lining segments are placed is subject to dimensional tolerances, it is necessary to sense the exact location of the tunnel lining segments that have actually already been placed or of the complete tunnel lining rings in the driven space. Furthermore, it is necessary to adapt and align the target placing of the respective tunnel lining segment with reference to the segments that have actually already been arranged, during the placing process. For this purpose, it is known from the prior art to use CCD cameras, contact sensors, laser profilometers, radar and ultrasound, for example. These are in some instances very inaccurate owing to environmental conditions during driving using the tunneling machine, such as moisture, dust, dirt, installation parts in the surroundings, etc.

It is therefore an object of the invention to implement an improvement of the sensing for the automated installation of the tunnel lining segments.

With regard to the device according to the invention, the object is achieved by means of the combination of features in patent claim 1. Further advantageous embodiments are defined by the dependent claims. Furthermore, with regard to the method, the object according to the invention is achieved by means of the combination of features in patent claim 10. Further advantageous embodiments are defined by the dependent claims.

The device according to the invention for the automated installation of at least one tunnel lining segment of a tunnel lining ring for lining a tunnel section driven by a tunneling machine, which device can be coupled to the tunneling machine, has non-exhaustively the following features:

a manipulator with at least one tool for picking up, holding and placing the at least one tunnel lining segment, and with at least one actuator for moving the at least one tool, wherein the at least one tool can be moved by means of the at least one actuator in a radial, tangential and/or axial direction with respect to the machine axis of the tunneling machine in the space of the tunnel section created by the tunneling machine, at least one tool position sensor, which is provided on the manipulator and/or tool, for sensing the respective actual position and actual location of the tool in the space of the tunnel section, at least one tunnel lining segment sensor, which is provided on the manipulator and/or tool, with which an actual position and/or actual location of at least one section of at least one already arranged tunnel lining segment can be sensed, and/or with which an actual position and/or actual location of the tunnel lining segment respectively to be placed can be sensed, at least one controller, which accesses installation data of the tunnel lining segments and which accesses the measurement data of the at least one tool position sensor and the at least one tunnel lining segment sensor, and with which the at least one actuator and the at least one tool can be controlled on the basis of the installation data and measurement data in order to move the tool from the picking-up position to the target placing position of the respective tunnel lining segment, to align it in the actual placing position and to arrange the tunnel lining segment against at least one already placed tunnel lining segment of a tunnel lining ring, wherein at least two tunnel lining segment sensors are provided, and wherein the tunnel lining segment sensor is a time-of-flight camera.

Time-of-flight cameras are 3D camera systems that measure distances by means of the time-of-flight method. For this purpose, the scene is illuminated by means of a light pulse, and for each pixel the camera measures the time needed for the light to travel to the object and back again. The required time is directly proportional to the distance. The camera thus yields for each pixel the distance of the object imaged thereon. What is advantageous in this case is that an entire scene is recorded all at once and does not have to be scanned.

Contrary to all expectations with regard to so-called time-of-flight cameras, which according to the knowledge of a person skilled in the art are suitable in particular for use over large distances, it has been found that accurate determinations of the locations of the already placed segments or lining rings are possible using these sensors in a particularly simple manner. Furthermore, location and distance or alignment of the tunnel lining segments to be placed in relation to the already placed tunnel lining segments can be determined particularly accurately; in particular, the joint distances are sensed in this case. As a result, it becomes possible in a simple manner for the controller to perform corresponding corrections and to place the segments correspondingly accurately. Moreover, it is possible here to effect three-dimensional sensing, in contrast to laser profilometers or other sensors.

In this case, it is advantageous that the at least one tool is a picking-up element. As a result, the respective segment can be gripped and moved in a simple manner.

Furthermore, it is advantageous that the at least one tool position sensor is a displacement measuring cylinder, rotary encoder, location sensor, inclinometer and/or displacement transducer. It is furthermore advantageous that the data are a laying plan of the tunnel lining segments to be placed, a delivery plan of the tunnel lining segments to be placed, a position of a picking-up location for picking up the tunnel lining segment respectively to be placed, a target placing position of the tunnel lining segment respectively to be placed, and/or information about the type and physical properties, such as for example the weight and dimensions, of the respective tunnel lining segment to be placed. As a result, it is possible in a simple manner for the controller to acquire all relevant data for ascertaining the necessary activations of the actuators in order to move the tunnel lining segment from the picking-up point to the actual placing.

A further teaching provides that a human-machine interface is connected to the controller. As a result, the automatic method can be extended by manual control instructions in a simple manner.

A further teaching provides that at least one additional tunnel lining segment sensor is provided, preferably as a time-of-flight camera or 2D camera. It is advantageous in this case that the additional tunnel lining segment sensor is provided in the region of the tunnel lining segment sensors or in the region of the tool. The signals thus sensed are then preferably evaluated for example by the controller by means of image processing. Furthermore, it is advantageous to superpose and/or to combine the data of the two tunnel lining segment sensors with the data of the further tunnel lining segment sensor. As a result, when moving to the target position, for example, it is possible to recognize obstacles in a simple manner. Furthermore, it is thereby possible to support the edge sensing of the tunnel lining segments and gap measurement between the tunnel lining segments and between the tunnel lining segments and the wall of the tunnel bore, for example by virtue of the fact that safety redundancy or faster processing can be achieved.

Furthermore, in a simple manner, it is also possible to achieve a measurement of the "shield tail clearance", the distance between the outer side of the tunnel lining segments and the wall of the tunnel bore, through traveling along the region.

A further teaching of the invention provides that the controller is connected to a controller of the tunneling machine. In this case, it is advantageous that functions of the tunneling machine can be activated by the controller of the device via the controller of the tunneling machine. As a result, in a simple manner, elements of the tunneling machine which have to be actuated for the automated installation of the tunnel lining segments can be activated by a controller in an automated manner.

A further teaching of the invention provides that advancing presses of the tunneling machine can be activated extendably and retractably by the controller, so that they can be pressed against placed tunnel lining segments. Holding of the tunnel lining segments after placing can thus be realized by way of the controller in a simple and safe manner.

A further teaching of the invention provides that a feeding unit (segment feeder) for feeding the tunnel lining segment to a picking-up location for being picked up by the tool can be activated by the controller, so that the tunnel lining segment can be made ready by way of the controller. As a result, in a simple manner, it is possible to achieve the feeding of the tunnel lining segments depending on the placing thereof.

A further teaching of the invention provides that a sensor of the time-of-flight camera records a 2D image.

The method according to the invention for the automated installation of at least one tunnel lining segment of a tunnel lining ring for lining a tunnel section driven by a tunneling machine with a device, in particular as described above, on which a manipulator fitted with at least one tool for picking up, holding and placing the at least one tunnel lining segment is provided, and which is provided in a tunneling machine, has non-exhaustively the following features:
- wherein the at least one tool is moved by at least one actuator in a radial, tangential and/or axial direction with respect to the machine axis of the tunneling machine in the space of the tunnel section created by the tunneling machine,
- wherein an actual position and actual location of the tool in the space of the tunnel section is sensed by at least one tool position sensor, which is provided on the manipulator and/or tool,
- wherein an actual position and/or actual location of at least one section of at least one already arranged tunnel lining segment is sensed by at least one tunnel lining segment sensor, which is provided on the manipulator and/or tool, and/or wherein an actual position and/or actual location of the tunnel lining segment respectively to be placed is sensed by the at least one tunnel lining segment sensor,
- wherein at least one controller, which accesses installation data of the tunnel lining segments and the measurement data of the at least one tool position sensor and the at least one tunnel lining segment sensor, is provided,
- wherein the at least one controller controls the at least one actuator and the at least one tool on the basis of the installation data and measurement data, so that the tool with the tunnel lining segment is moved from its respective picking-up position to its respective target placing position and, on the basis of the measurement data of the tunnel lining segment sensor, the tunnel lining segment is aligned in the actual placing position and arranged against at least one already placed tunnel lining segment of a tunnel lining ring,
- wherein at least two tunnel lining segment sensors are provided, and
- wherein the tunnel lining segment sensor is a time-of-flight camera.

A further teaching provides that the at least one tool is a picking-up element. As a result, the respective segment can be gripped and moved in a simple manner.

It is advantageous in this case that the at least one tool position sensor is a displacement measuring cylinder, rotary encoder, location sensor, inclinometer and/or displacement transducer. It is furthermore advantageous that the data are a laying plan of the tunnel lining segments to be placed, a delivery plan of the tunnel lining segments to be placed, a position of a picking-up location for picking up the tunnel lining segment respectively to be placed, a target placing position of the tunnel lining segment respectively to be placed, and/or information about the type and physical properties, such as for example the weight and dimensions, of the respective tunnel lining segment to be placed. As a result, it is possible in a simple manner for the controller to acquire all relevant data for ascertaining the necessary activations of the actuators in order to move the tunnel lining segment from the picking-up point to the actual placing.

It is furthermore advantageous that a human-machine interface is connected to the controller. As a result, the automatic method can be extended by manual control instructions in a simple manner.

It is furthermore advantageous that at least one additional tunnel lining segment sensor is provided, preferably as a time-of-flight camera or 2D camera. The signals thus sensed are then preferably evaluated for example by the controller by means of image processing. It is advantageous in this case that the additional tunnel lining segment sensor is provided in the region of the tunnel lining segment sensors or in the region of the tool. The signals thus sensed are then preferably evaluated for example by the controller by means of image processing. Furthermore, it is advantageous to superpose and/or to combine the data of the two tunnel lining segment sensors with the data of the further tunnel lining segment sensor. As a result, when moving to the target position, for example, it is possible to recognize obstacles in a simple manner. Furthermore, it is thereby possible to support the edge sensing of the tunnel lining segments and gap measurement between the tunnel lining segments and between the tunnel lining segments and the wall of the tunnel bore, for example by virtue of the fact that safety redundancy or faster processing can be achieved.

A further teaching of the invention provides that a sensor of the time-of-flight camera records a 2D image.

A further teaching of the invention provides that the controller is connected to a controller of the tunneling machine. In this case, it is advantageous that the controller of the device activates functions of the tunneling machine via the controller of the tunneling machine. As a result, in a simple manner, elements of the tunneling machine which have to be actuated for the automated installation of the tunnel lining segments can be activated by a controller in an automated manner.

A further teaching of the invention provides that a feeding unit (segment feeder) for feeding the tunnel lining segment to a picking-up location for being picked up by the tool is controlled by the controller, so that the tunnel lining segment is made ready by way of the controller. As a result, in a simple manner, it is possible to achieve the feeding of the tunnel lining segments depending on the placing thereof.

A further teaching of the invention provides that advancing presses of the tunneling machine can be activated extendably and retractably by the controller, so that they can be pressed against placed tunnel lining segments. Holding of the tunnel lining segments after placing can thus be realized by way of the controller in a simple and safe manner.

A further teaching of the invention provides that, once the last tunnel lining segment (keystone) of the tunnel lining segment ring has been fitted, the manipulator measures with at least two time-of-flight cameras a distance between the tunnel lining segments of the tunnel lining segment ring and a borehole wall of the tunnel section, preferably in that the tunnel lining segment ring is at least partially travelled along. As a result, in a simple manner, it is also possible to achieve a measurement of the "shield tail clearance", the distance between the outer side of the tunnel lining segments and the wall of the tunnel bore, through traveling along the region. Furthermore, monitoring of the shield tail clearance by means of further measuring instruments, for example by means of ultrasonic sensors, can optionally be omitted.

A further teaching of the invention provides that, after the placing of the tunnel lining segment at the target position, the tool of the manipulator remains connected to the placed tunnel lining segment and, when the tunnel lining segment is being pressed by at least one of the advancing presses of the tunneling machine, is moved along with it, and in that during this the movement of the tool is sensed. As a result, the final position of the tunnel lining segment can be sensed in a simple manner.

Figure 2:
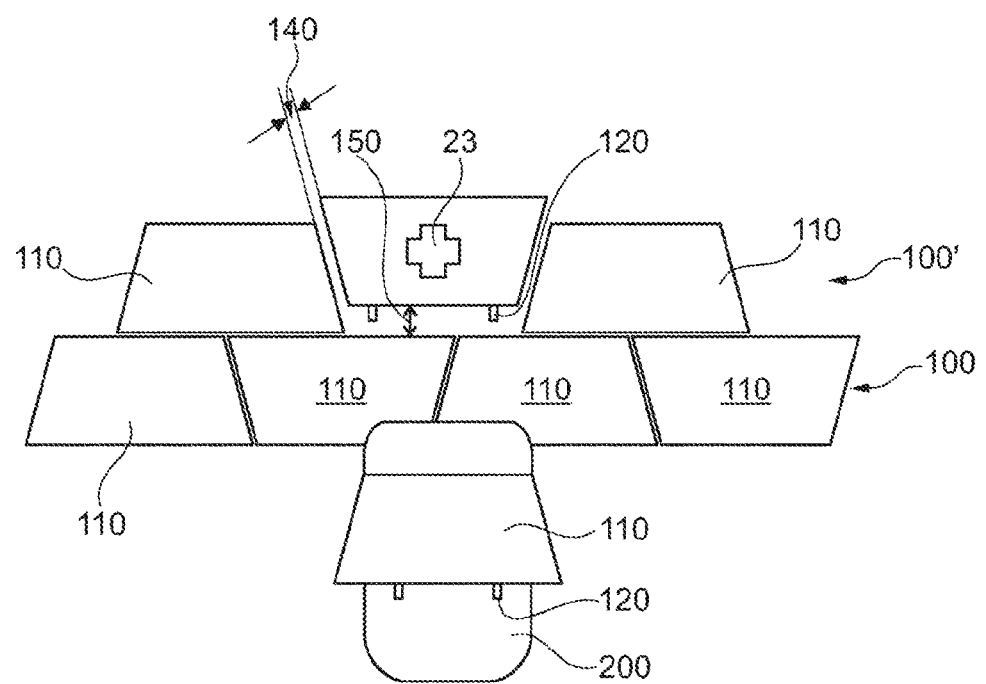
Figure 3:
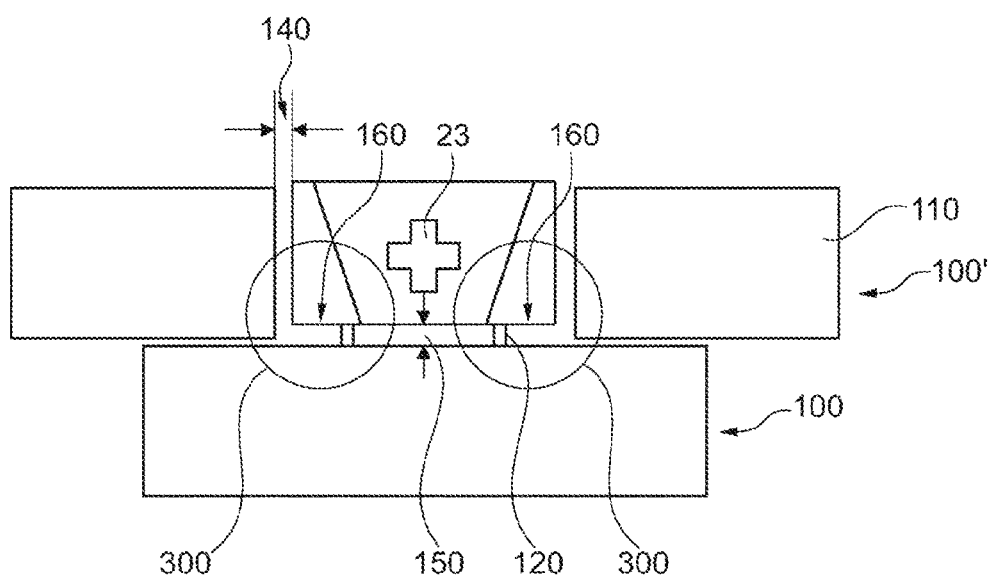
Figure 4A:
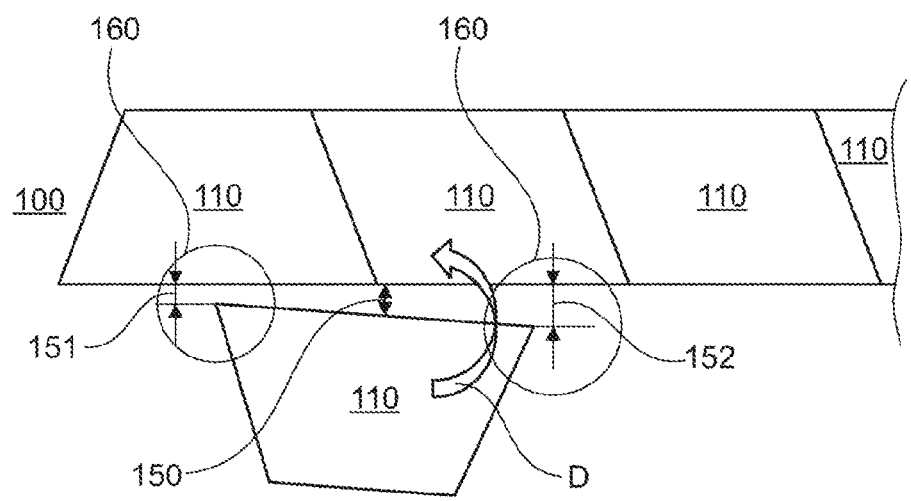
Figure 4B:
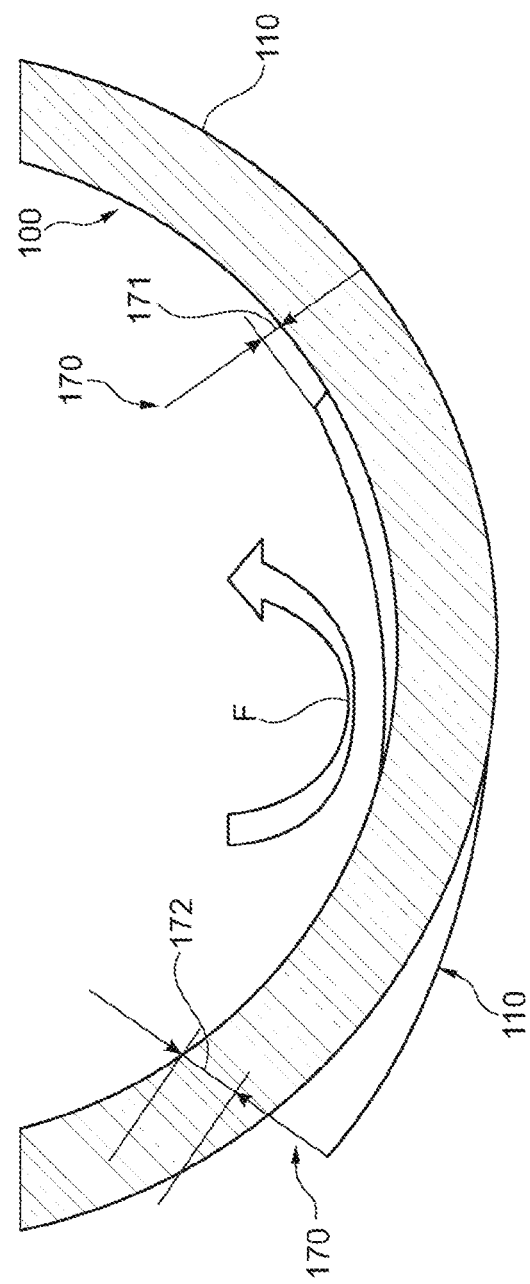
Figure 4C:
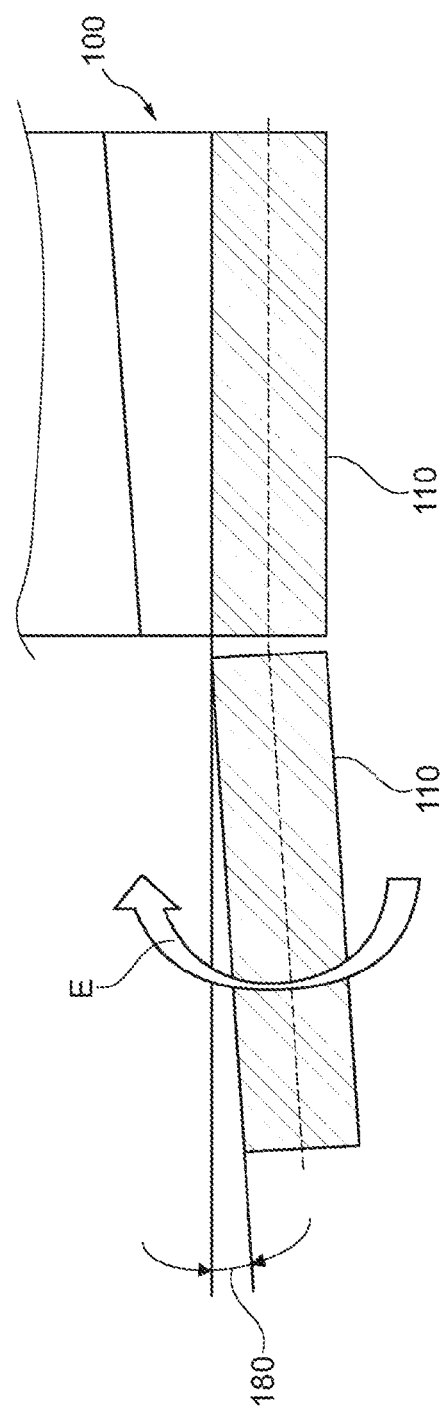
Figure 4E:
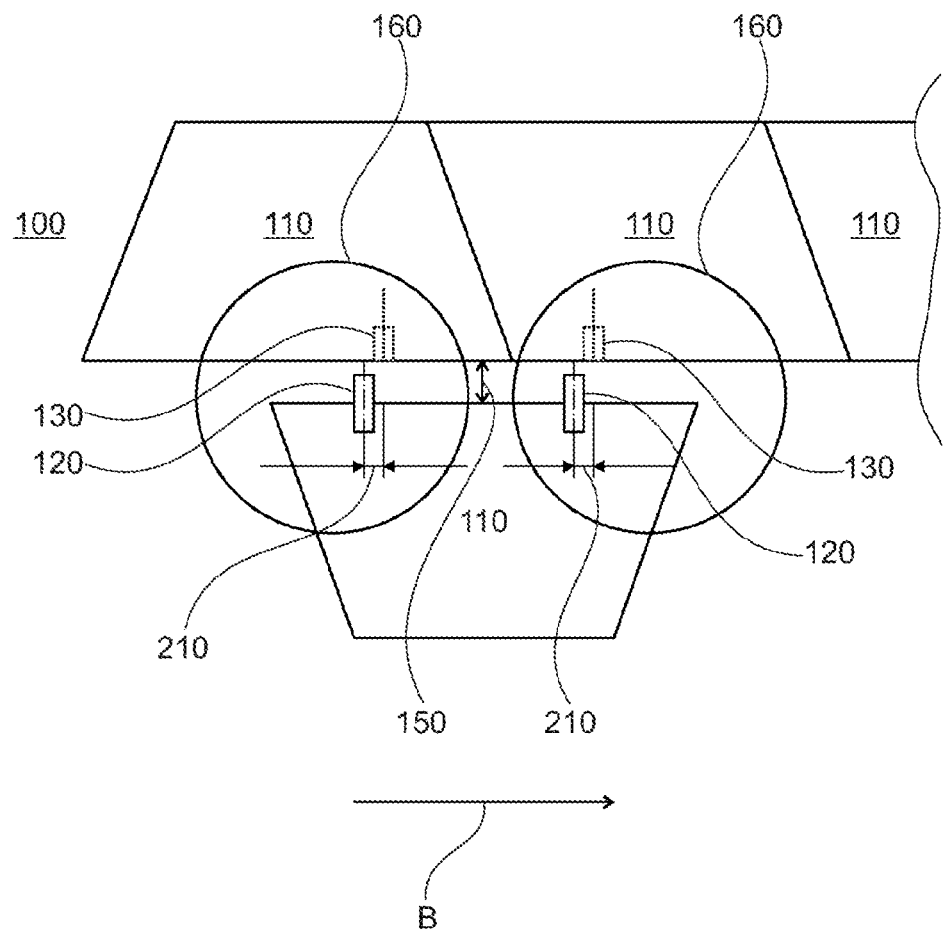
Figure 5A:
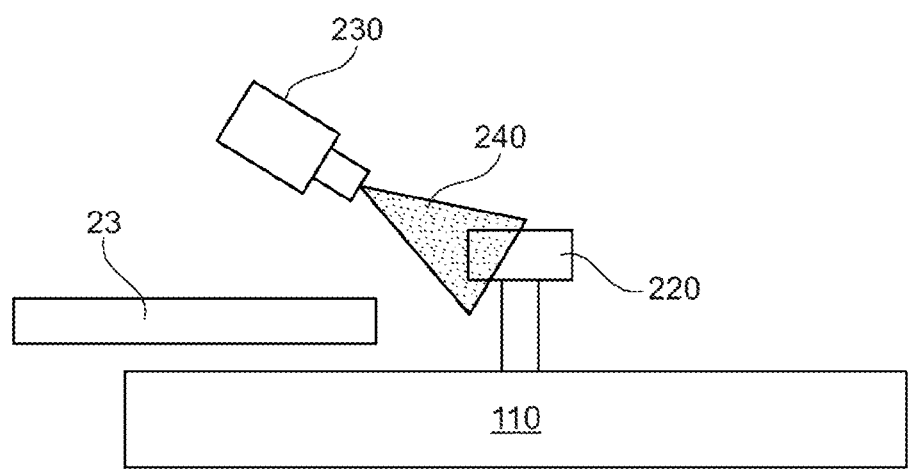
Figure 5B:
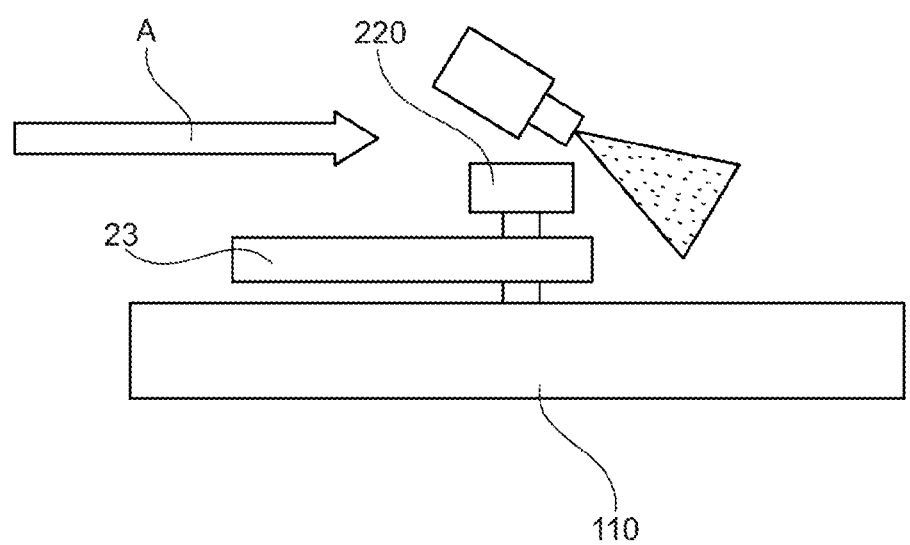

The invention is explained in greater detail below on the basis of a preferred exemplary embodiment in association with a drawing, in which:

FIG. 1 shows a three-dimensional view of an erector with a tunnel lining segment having been picked up, FIG. 2 shows a schematic illustration of the placing of a tunnel lining segment, FIG. 3 shows a schematic view of placing according to the invention of a tunnel lining segment in association with the device according to the invention using the method according to the invention, FIGS. 4*a* to 4*e* show a schematic view of the fine adjustment steps prior to placing the tunnel lining segment at the target position, and FIGS. 5*a*, 5*b* show a schematic illustration of picking up a tunnel lining segment.

FIG. 1 shows an erector 10 as a device according to the invention having a main support 11, on which connecting elements 12 for connection to a tunneling machine (not illustrated) are arranged. The connecting element 12 is illustrated here in flange-like fashion.

A manipulator 20 is arranged on the main support 11; at least one travel support 13 having sliding guides 14 on both sides here, for example, is provided on said manipulator. There are arranged movably in the sliding guides 14 for example guide elements 15 likewise as part of the manipulator 20. The guide elements 15, on which there is arranged for example the rotary frame 16 likewise as part of the manipulator 20, can be displaced in arrow direction A by way of cylinders 19 as actuators.

There is arranged on the guide elements 15 for example a rotary frame 16 as part of the manipulator 20. The rotary frame 16 has a rotational drive 17 as an actuator. There is arranged rotatably on the rotary frame 16 for example a rotary ring 18 as part of the manipulator 20. The rotary ring 18 can carry out a rotational movement by way of the rotational drive 17 as actuator on the rotary frame 16. The rotary ring 18 can be moved in arrow direction B.

There is arranged on the rotary ring 18 a manipulator arm 21 as part of the manipulator 20. Said manipulator arm can correspondingly be rotated with the rotary ring 18. The manipulator arm 21 can be pivoted for example relative to the rotary frame 16. This is effected for example by way of at least one cylinder 22 as actuator.

An erector head 23 as tool is provided on the manipulator arm itself. Said erector head serves for picking up a tunnel lining segment 110. The erector head 23 is moved radially in the arrow direction C here for example as a result of the actuation of the cylinder 22 as actuator.

For fine adjustment of the position of the tunnel lining segments 110, as is illustrated in FIGS. 4*a* to 4*e*, the erector head 23 has a possibility of rotation in the arrow direction D for example by way of the cylinder 24 as actuator. Furthermore, the erector head 23 has movement elements 25 as actuators, for example, by means of which the tunnel lining segment 110 can be tilted in the arrow direction E or pivoted in the arrow direction F.

The tunnel lining segment 110 is picked up at a picking-up position 200 (see FIG. 2) analogously to the arrangement of the erector head 23 illustrated in FIG. 1. The tunnel lining segment 110 is transported to the picking-up position 200 for example by a so-called segment feeder (not illustrated). By means of an activation of the cylinders 19, 22, 24 and also the movement elements 25 and the rotational drive 17 by a controller (not illustrated), the tunnel lining segment 110 can be arranged in the tunnel section driven by the tunneling machine by means of movement in the arrow directions A to F.

The controller causes the tunnel lining segment 110 that is to be placed to be moved into the region of the target placing. This is illustrated in FIG. 2, for example. In this case, the erector head 23 with the tunnel lining segment 110 situated thereon was moved into a corresponding position by the controller via the actuators 17, 19, 22, 24, 25. FIG. 2 illustrates a completed lining ring 100 consisting of individual already placed tunnel lining segments 110. Arranged spatially in front thereof is a further tunnel lining ring 100', which has not yet been completed. FIG. 2 illustrates the tunnel lining segment 110 to be placed with a longitudinal joint distance 140 at its short sides and a ring joint distance 150 at its long side. Dowels 120 are provided as a mounting aid, which dowels can be inserted into openings 130 (see FIGS. 1, 4*e*).

In order now to achieve an arrangement of the actual placing of the tunnel lining segment 110 in conjunction with the already placed tunnel lining segments 110, the corner regions 160 (see FIG. 3) of the tunnel lining segment 110 to be laid are each scanned by means of a time-of-flight camera (not illustrated) as tunnel lining segment sensors (not illustrated) and optionally for example by a CCD camera as 2D sensor as further tunnel lining sensor (not illustrated). The scanning regions 300 are illustrated in FIG. 3. It is thereby possible to sense the longitudinal joint distances 140 and ring joint distances 150 and also a possible inclination error of the tunnel lining segment 110 to be laid with respect to the already arranged tunnel lining segments 110. On the basis of these acquired data, the controller can then correspondingly activate the actuators in order firstly to insert the dowels 120 into the openings 130 provided therefor and at the same time to place the tunnel lining segment 110 to be laid at its real actual position. Optionally, the data of the tunnel lining segment sensors are combined, amalgamated or superposed in order to enable better recognition.

Heading toward the target position is effected for example by the individual movements of the actuators being sensed by way of measurement sensors. As a result, the controller can accurately determine the current position of the tool or the erector head 23 in space. On the basis of the other dimensions known and further guide aids (not illustrated here) during picking up by means of the erector head 23, the position of the tunnel lining segment 110 to be placed is thus known indirectly as well. By this means, the controller can move the tunnel lining segment 110 into the region of a target placing location. Optionally, active obstacle recognition also takes place in this case by way of the additional tunnel lining segment sensor, for example. It is only starting from this point in time that it is then expedient to monitor the corner regions 160 by means of 3D sensing by time-of-flight cameras by way of the scanning regions 300 being monitored and the actual longitudinal joint distances 140 and ring joint distances 150 and also possible inclination errors being directly ascertained. The shape of the scanning regions 300 is illustrated merely by way of example here. For example, a rectangular shape is also possible. On the basis thereof, the tunnel lining segment 110 is then placed at the real actual position as placement position. By way of advancing presses (not illustrated), the tunnel lining segment 110 is then pressed to the final position in the tunnel lining ring. In this case, the tool 23 preferably still remains on the placed tunnel lining segment and is concomitantly moved by the advancing presses during the movement of the tunnel lining segment into the final position. This movement is preferably sensed, such that the final position can be documented.

The fine adjustment of the actual position and actual location of the tunnel lining segment 110 toward the necessary target location and target position, in particular relative to the actual position and actual location of the already fitted tunnel lining segments 110, is shown in FIGS. 4*a* to 4*e*. For the fine adjustment, the regions 160 are monitored with regard to the corresponding compensation values. Here the positions of the edges and surfaces with respect to one another are in each case sensed and compared in order to ascertain the respectively necessary adjustment movements for the fine adjustment.

FIG. 4*a* here shows the rotation of the tunnel lining segment 110 in the arrow direction D in order to achieve uniform ring joint distances 150. The illustration shows a smaller ring joint distance 151 in the left corner region 160 in comparison with the larger ring joint distance 152 in the right corner region 160, which are matched to the required ring joint distance 150 by rotation of the tool 23 in the arrow direction D in order to achieve a parallelism of the edges of the tunnel lining segments 110.

In FIG. 4*b*, the tool 23 is rotated in the arrow direction F in order to bring the radial distances 170 to zero, which are illustrated here with different magnitudes as radial distance 171, 172. It is only if the radial distance 170 is optimally zero that the tunnel lining segment 110 can be placed correctly.

FIG. 4*c* shows an angle offset 180, which should likewise be zero for correct placing. The angle offset 180 is set to zero by tilting the tool 23 in the arrow direction E.

Furthermore, it is necessary for the edges of the tunnel lining segments 110 to have the same height and for there to be no height offset 190. For this purpose, the tool 23 is moved in the arrow direction B.

Furthermore, analogously to FIG. 4*e*, it is necessary to bring about an alignment of the dowels 120 and the dowel holes 130 if dowels 120 are used for placing. In this case, the tunnel lining segment sensors sense the dowels 120 and the holes 130 at the respective tunnel lining segments. The distance 210 must then likewise be zero in order that the tunnel lining segments 110 can be placed correctly. This is brought about by a rotation of the tool 23 in the arrow direction B.

After the final placing of the last tunnel lining segment 110 of a tunnel lining ring 100, the distance between the tunnel lining ring 100 and the wall of the tunnel borehole can be measured in order to determine the shield tail clearance. For this purpose, the manipulator 20 with the tool 23 and the tunnel lining segment sensors situated thereon travels along the gap (not illustrated) and senses it. By way of example, damage on the tunnel lining segments 110 can be sensed in the process.

Furthermore, with the tunnel lining segment sensors, the finally placed tunnel lining ring 100 can be traveled along in order to sense the final positions of the individual tunnel lining segments 110 of the tunnel lining ring 100. By way of example, the edges of the tunnel lining segments and the courses of the edges of the tunnel lining segments 110 with respect to one another are sensed in this case. By way of example, damage on the tunnel lining segments 110 can be sensed in the process.

The monitoring, measuring and placing of the tunnel lining segment 110 or the movement thereof in space can be assisted by 2D monitoring for example by means of cameras (not illustrated) or by a sensor of the time-of-flight camera and an evaluation of the data obtained in this case, by means of the 2D image data obtained in this case being combined with the 3D image data.

FIGS. 5*a*, 5*b* illustrate by way of example picking up of a tunnel lining segment 110 by the tool 23. A pin 220 is used here for the picking up, said pin being connected to the tunnel lining segment 110 centrally, for example. For the picking up, the tool is moved in the arrow direction A in order then to be able to grip the pin 220 and thus to provide a connection between tool and tunnel lining segment 110 in order that the tunnel lining segment 110 can be moved from the picking-up position 200 to the target placing position.

In order to be able to sense the pin, a further tunnel lining segment sensor 230 is preferably provided here, which is arranged on the tool 23. Said further tunnel lining segment sensor has a sensing region 240 situated in front of the tool in order to be able to recognize the pin 230 optimally in good time. Once this has been done, the location of the tool is aligned by the controller by way of 17, 19, 22, 24, 25 such that the tool can preferably travel in the arrow direction A into the pin 220.

The further tunnel lining segment sensor 230 is preferably a time-of-flight camera. The latter can preferably provide both 3D images and 2D images.

The invention claimed is:

1. A device for the automated installation of at least one tunnel lining segment of a tunnel lining ring for lining a tunnel section driven by a tunneling machine, which device can be coupled to the tunneling machine,
   having a manipulator with at least one tool for picking up, holding and placing the at least one tunnel lining segment, and with at least one actuator for moving the at least one tool, wherein the at least one tool can be moved by means of the at least one actuator in a radial, tangential and/or axial direction with respect to the machine axis of the tunneling machine in the space of the tunnel section created by the tunneling machine, having at least one tool position sensor, which is provided on the manipulator and/or tool, for sensing the respective actual position and actual location of the tool in the space of the tunnel section, having at least one tunnel lining segment sensor, which is provided on the manipulator and/or tool, with which an actual position and/or actual location of at least one section of at least one already arranged tunnel lining segment can be sensed, and/or with which an actual position and/or actual location of the tunnel lining segment respectively to be placed can be sensed, having at least one controller, which accesses installation data of the tunnel lining segments and which accesses the measurement data of the at least one tool position sensor and the at least one tunnel lining segment sensor, and with which the at least one actuator and the at least one tool can be controlled on the basis of the installation data and measurement data in order to move the tool from the picking-up position to the target placing position of the respective tunnel lining segment, to align it in the actual placing position and to arrange the tunnel lining segment against at least one already placed tunnel lining segment of a tunnel lining ring, wherein at least two tunnel lining segment sensors are provided, and wherein the tunnel lining segment sensor is a time-of-flight camera.

2. The device as claimed in claim 1, wherein the at least one tool is a picking-up element.

3. The device as claimed in claim 1, wherein the at least one tool position sensor is a displacement measuring cylinder, rotary encoder, location sensor, inclinometer and/or displacement transducer.

4. The device as claimed in claim 1, wherein the data are a laying plan of the tunnel lining segments to be placed, a delivery plan of the tunnel lining segments to be placed, a position of a picking-up location for picking up the tunnel lining segment respectively to be placed, a target placing position of the tunnel lining segment respectively to be placed, and/or information about the type and physical properties, such as for example the weight and dimensions, of the respective tunnel lining segment to be placed.

5. The device as claimed in claim 1, wherein at least one additional tunnel lining segment sensor is provided, preferably as a time-of-flight camera or 2D camera.

6. The device as claimed in claim 5, wherein the additional tunnel lining segment sensor is provided in the region of the tunnel lining segment sensors or in the region of the tool.

7. The device as claimed in claim 1, wherein advancing presses of the tunneling machine can be activated extendably and retractably by the controller, so that they can be pressed against placed tunnel lining segments.

8. The device as claimed in claim 1, wherein a feeding unit (segment feeder) for feeding the tunnel lining segment to a picking-up location for being picked up by the tool can be activated by the controller, so that the tunnel lining segment can be made ready by way of the controller.

9. The device as claimed in claim 1, wherein a sensor of the time-of-flight camera records a 2D image.

10. A method for the automated installation of at least one tunnel lining segment of a tunnel lining ring for lining a tunnel section driven by a tunneling machine with a device on which a manipulator fitted with at least one tool for picking up, holding and placing the at least one tunnel lining segment is provided, and which is provided in a tunneling machine, wherein the at least one tool is moved by at least one actuator in a radial, tangential and/or axial direction with respect to the machine axis of the tunneling machine in the space of the tunnel section created by the tunneling machine, wherein an actual position and actual location of the tool in the space of the tunnel section is sensed by at least one tool position sensor, which is provided on the manipulator and/or tool, wherein an actual position and/or actual location of at least one section of at least one already arranged tunnel lining segment is sensed by at least one tunnel lining segment sensor, which is provided on the manipulator and/or tool, and/or wherein an actual position and/or actual location of the tunnel lining segment respectively to be placed is sensed by the at least one tunnel lining segment sensor, wherein at least one controller, which accesses installation data of the tunnel lining segments and the measurement data of the at least one tool position sensor and the at least one tunnel lining segment sensor, is provided, wherein the at least one controller controls the at least one actuator and the at least one tool on the basis of the installation data and measurement data, so that the tool with the tunnel lining segment is moved from its respective picking-up position to its respective target placing position and, on the basis of the measurement data of the tunnel lining segment sensor, the tunnel lining segment is aligned in the actual placing position and arranged against at least one already placed tunnel lining segment of a tunnel lining ring, wherein at least two tunnel lining segment sensors are provided, and wherein the tunnel lining segment sensor is a time-of-flight camera.

11. The method as claimed in claim 10, wherein the at least one tool is a picking-up element.

12. The method as claimed in claim 10, wherein the at least one tool position sensor is a displacement measuring cylinder, rotary encoder, location sensor, inclinometer and/or displacement transducer.

13. The method as claimed in claim 10, wherein the data are a laying plan of the tunnel lining segments to be placed, a delivery plan of the tunnel lining segments to be placed, a position of a picking-up location for picking up the tunnel lining segment respectively to be placed, a target placing position of the tunnel lining segment respectively to be placed, and/or information about the type and physical properties, such as for example the weight and dimensions, of the respective tunnel lining segment to be placed.

14. The method as claimed in claim 10, wherein at least one additional tunnel lining segment sensor is provided, preferably as a time-of-flight camera or 2D camera.

15. The method as claimed in claim 14, wherein the additional tunnel lining segment sensor is provided in the region of the tunnel lining segment sensors or in the region of the tool.

16. The method as claimed in claim 14, wherein the data of the two tunnel lining segment sensors are combined with the data of the additional tunnel lining segment sensor.

17. The method as claimed in claim 10, wherein a sensor of the time-of-flight camera records a 2D image.

18. The method as claimed in claim 10, wherein a feeding unit (segment feeder) for feeding the tunnel lining segment to a picking-up location for being picked up by the tool is controlled by the controller, so that the tunnel lining segment is made ready by way of the controller.

19. The method as claimed in claim 10, wherein advancing presses of the tunneling machine are activated extendably and retractably by the controller, so that they are pressed against placed tunnel lining segments.

20. The method as claimed in claim 10, wherein, once the last tunnel lining segment (keystone) of the tunnel lining segment ring has been fitted, the manipulator measures with at least two time-of-flight cameras a distance between the tunnel lining segments of the tunnel lining segment ring and a borehole wall of the tunnel section, preferably in that the tunnel lining segment ring is at least partially travelled along.

21. The method as claimed in claim 10, wherein, after the placing of the tunnel lining segment at the target position, the tool of the manipulator remains connected to the placed tunnel lining segment and, when the tunnel lining segment is being pressed by at least one of the advancing presses of the tunneling machine, is moved along with it, and in that during this the movement of the tool is sensed.

* * * * *